(12) United States Patent
Sauer (10) Patent No.: US 6,604,558 B2
(45) Date of Patent: Aug. 12, 2003

(54) AIRCRAFT FUEL INERTING SYSTEM FOR AN AIRPORT

(75) Inventor: Richard A. Sauer, Hinsdale, IL (US)

(73) Assignee: L'Air Liquide Société Anonyme à Directoire et Conseil de Surveillance pour l'Étude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/032,983

(22) Filed: Dec. 28, 2001

(65) Prior Publication Data

US 2002/0088504 A1 Jul. 11, 2002

Related U.S. Application Data (60) Provisional application No. 60/259,976, filed on Jan. 5, 2001.

(30) Foreign Application Priority Data

Sep. 28, 2001 (WO) .............................. PCT/US01/31171

(51) Int. Cl.[7] .......................... B01D 53/22; B01D 53/02
(52) U.S. Cl. ............................ 141/98; 141/44; 141/64; 141/94; 95/96
(58) Field of Search ................................ 141/44, 45, 52, 141/64, 94, 98; 95/96; 244/135 A, 135 B (56) References Cited

U.S. PATENT DOCUMENTS

| | | | |
|---|---|---|---|
| 2,965,196 A | 12/1960 | Rich, Jr. ................ 96/130 X |
| 3,691,730 A | 9/1972 | Hickey et al. ............ 55/166 |
| 3,948,626 A | 4/1976 | Bragg ..................... 55/160 |
| 4,058,147 A | 11/1977 | Stary et al. ............ 96/130 X |
| 4,378,920 A | 4/1983 | Runnels et al. ......... 244/135 R |
| 4,397,661 A | 8/1983 | King et al. ................ 96/8 |
| 4,556,180 A | 12/1985 | Manatt ................ 244/135 R |
| 4,681,602 A | 7/1987 | Glenn et al. ............. 95/47 |
| 4,894,068 A | 1/1990 | Rice ..................... 95/54 X |
| 5,013,331 A | 5/1991 | Edwards et al. ........... 95/54 X |
| 5,021,071 A | 6/1991 | Reddy ................... 95/130 X |
| 5,156,009 A | 10/1992 | Woodruff ................ 95/54 X |

(List continued on next page.)

FOREIGN PATENT DOCUMENTS

| | | |
|---|---|---|
| WO | WO 99/34106 | 7/1999 |
| WO | WO 00/00389 | 1/2000 |

OTHER PUBLICATIONS

DOT/FAA/AR–00/19 Cavage, Wm., M., The Cost of Implementing Ground–Based Fuel Tank Inerting in the Commercial Fleet, National Technical Informatin Service, Springfield, Virginia 22161, Final Report May 2000.

Air Liquide—MEDAL's Air Separation Membrane—The Technology at the Heart of OBIGGS, Inerting Task Group Presentation, Fuel Tank Harmonization Working Group, Mar. 18, 1998.

(List continued on next page.)

*Primary Examiner*—J. Casimer Jacyna
(74) *Attorney, Agent, or Firm*—Jeffrey C. Lew (57) ABSTRACT

A multicomponent, ground based system for reducing the hazard of explosion of aircraft fuel in the on board tanks of aircraft. The system is adapted to provide a supply of scrubbed fuel having a low concentration of dissolved oxygen. The scrubbed fuel can be supplied from bulk storage tanks to dispensing stations nearby the aircraft loading and boarding positions at an airport. The system also includes equipment adapted to wash the ullage of the aircraft fuel tanks to remove excess oxygen above the fuel in the tanks. The system further includes a gas cleaning unit to strip excessive amounts of volatile organic compounds from gas exhausted during operation of the system thereby producing environmentally benign atmospheric emissions. The system also includes redundant sources of inert gas so that the system can continue to operate in the contingency that one of the inert gas sources temporarily ceases to operate.

9 Claims, 3 Drawing Sheets

U.S. PATENT DOCUMENTS

| | | | |
|---|---|---|---|
| 5,176,002 A | 1/1993 | O'Brien et al. | 62/48.2 |
| 5,266,101 A | 11/1993 | Barbe et al. | 95/47 X |
| 5,308,382 A | 5/1994 | Prasad | 95/54 X |
| 5,388,413 A | 2/1995 | Major et al. | 95/54 X |
| 5,388,650 A | 2/1995 | Michael | 175/71 |
| 5,480,682 A | 1/1996 | Kaiser et al. | 95/47 X |
| 5,582,030 A | 12/1996 | Dannohl | 95/47 X |
| 5,588,984 A | 12/1996 | Verini | 95/54 X |
| 5,730,780 A | 3/1998 | Booth, III | 95/54 X |
| 5,985,002 A | 11/1999 | Grantham | 95/47 |
| 6,093,238 A | 7/2000 | Huf | 95/54 X |
| 6,293,996 B1 | 9/2001 | Grantham et al. | 95/47 |
| 6,315,815 B1 | 11/2001 | Spadaccini et al. | 95/54 X |

OTHER PUBLICATIONS

Air Liquide—GBI Cost Analysis—NEA System Architecture, GBI Cost Study Feb. 29, 2000.

Aviation Rulemaking Advisory Committee Fuel Tank Harmonization Working Group Final Report Jul., 1998.

Timpe, Ronald C., et al., Flight Safety, Endurance, and Evaporative Emissions Improvement Via Jet Fuel–Cooling—Polarjet™ Fuel Treatment Demonstration, University of N. Dakota, Oct., 1999.

Air Liquide Brochures for APSA™ Advanced Product Supply Approach, FLOXAL®, Nitrogen Membrane System, SOLVAL™ VOC Removal and Recovery System, and VESTAL–O2 control unit.

Dornheim, M.A., *Airline Industry Takes Fresh Look at Inerting* Aviation Week and Space Technology, US, McGraw–Hill, Inc.,New York, vol. 147, No.2, p. 60–61, XP000699956, ISSN:0005–2175.

Clodfelter, Robert, G. *The Evolution of On–Board Inert Gas Generation Systems (OBIGGS)* Proceedings of the 27th Annual Symposium of Safe Association, Dec. 5–8, 1989, pp. 19–24, XP0002122565, New Orleans LA.

AIRCRAFT FUEL INERTING SYSTEM FOR AN AIRPORT

This application claims benefit of provisional application No. 60/259,976 filed Jan. 5, 2001.

FIELD OF THE INVENTION

This invention relates to making the head space of aircraft fuel tanks inert to combustion and more specifically to a system and a process utilizing inert gas to reduce the oxygen content of the head space and the aircraft fuel in the tanks.

BACKGROUND OF THE INVENTION

Recently a number of aircraft explosions have occurred which resulted in loss of life, injury to persons and extensive destruction of property. Cause for many of these explosions is attributed to the detonation and catastrophic combustion of fuel in the fuel tanks of the aircraft. The commercial aircraft industry, authorities that regulate the industry and users of commercial aircraft are concerned about safety from fuel tank explosions. There is a great need for technological advances to reducing the risk of this hazard.

In operation, aircraft fuel tanks contain a liquid inventory of aircraft fuel and a vapor composition in the space within the tank not occupied by the liquid fuel. This space is often referred to as the "ullage" or "the head space" of the tank. Oxygen mixed with fuel vapor is usually present in the head space. One likely cause of fuel tank explosions is the simultaneous combination of an explosively combustible mixture of oxygen and fuel vapor in the head space and a source of ignition. Such ignition sources are due to accidental fire, sparking due to faulty or degraded electrical system components, static electricity discharge, or energy suddenly released on impact by collision with an object, for example. If the oxygen-fuel vapor explodes, it is likely to destroy the integrity of the tank and thereby release more fuel to exacerbate the disaster.

One way to negate the possibility of an explosively combustible oxygen-fuel vapor mixture forming in an aircraft fuel tank is to prevent the concentration of oxygen in the head space from exceeding the minimum limits for flammability. Oxygen can enter the head space in gaseous form when fuel is consumed by the aircraft engines. That is, as the fuel is consumed, the level of liquid fuel in the tank is lowered, which draws in ambient air containing about 21 vol. % oxygen from outside the tank to fill the void created by the vacated fuel.

Oxygen can also enter the tank with the fuel. For example, oxygen dissolves in the fuel when the fuel is stored in vented storage tanks at an airport prior to filling the aircraft fuel tank. That is, due to vapor-liquid equilibrium, some of the oxygen present in the atmosphere above the fuel diffuses and dissolves into the liquid phase. In flight, the local ambient pressure drops due to the change of aircraft altitude. The vapor liquid equilibrium shifts to favor liberation of substantial amounts of the dissolved oxygen into the head space vapor as the pressure goes down.

Oxygen concentration of the fuel tank head space can be reduced by initially purging it from the tank and replenishing the volume voided during fuel consumption with an inert gas, e.g., nitrogen, carbon dioxide, argon, and others. The procedure of displacing the vapor in the head space with one of another concentration or composition is sometimes referred to herein as "ullage washing" or "head space inerting". Also, the liquid fuel can be purged to very low concentrations of oxygen prior to filling the tank. The latter process typically involves contacting the liquid fuel with large quantities of inert gas. The dissolved oxygen redistributes between the liquid and the low oxygen content scrubbing gas which is swept away leaving less oxygen in the fuel. The procedure of removing dissolved oxygen from liquid fuel is sometimes referred to herein as "fuel scrubbing" or "fuel deoxygenation".

Conventional cryogenic methods of producing sufficient quantities of oxygen-free or nearly free inert gas for fuel deoxygenation and/or head space washing operate at extreme temperatures and pressures. They usually utilize large, heavy, complex and often noisy machinery that requires high power to operate. Cryogenic inert gas production facilities are also usually expensive. These factors normally promote location of such facilities remotely from commercial aircraft fuel tank dispensing sites and airport passenger terminal buildings. Cryogenic inert gas production typically results in a highly pressurized inert material in liquid form, for example, liquid nitrogen, which is stored at well below ambient temperature. Body contact with liquid nitrogen can cause serious personal injury.

It would therefore be desirable to provide a method by which inert gas, preferably nitrogen, can be conveniently and efficiently supplied to aircraft fuel tank dispensing sites for head space washing and/or fuel deoxygenation operations in a manner that eliminates problems associated with cryogenic inert gas, especially cryogenic nitrogen.

Head space inerting can involve exhausting the gas in equilibrium with the liquid fuel inventory from aircraft fuel tank. Such gas includes volatile organic components of fuel vapor which pollutes the ambient atmosphere and thereby creates risk of damage to health of personnel in the area and to the environment. Hence, it is desirable to provide an aircraft fuel tank inerting system that produces significantly less air pollution than conventional practices.

SUMMARY OF THE INVENTION

This invention provides a system comprising a variety of elements which as a unit provide the ability to produce and maintain low concentrations of oxygen in aircraft fuel tank head space and liquid fuel conveniently, environmentally safely and relatively economically. The reduced oxygen concentrations are effective to significantly reduce the explosion potential of the head space during aircraft operation. The system is based on the ground and features an inert gas distribution subsystem adapted to dispense head space inerting gas to each aircraft boarding/loading location at an airport.

DETAILED DESCRIPTION

One aspect of this invention is to provide a system to be deployed at and/or in close proximity to an airport. The system is operative to reduce or eliminate the risk of explosion hazard within the fuel tank of all types of airplanes, including commercial aircraft. It is impractical to completely eliminate all potential sources of ignition near aircraft fuel as it is handled at an airport. Hence, a preferred option to eliminate an uncontrolled detonation is to remove enough of the oxygen in and near the liquid fuel to render the fuel tank contents not explosively combustible. This invention therefore deals with the removal of a portion of the oxygen from the gas head space above the liquid fuel in the airliner fuel tanks as well as the reduction of the dissolved oxygen content of the liquid fuel itself These features of the invention can result in the exhaust to atmosphere of some inert gas bearing entrained volatile organic components ("VOC"). Accordingly, in another aspect of this invention, the novel system provides environmental control elements adapted to limit potential environmentally hazardous emissions during treatment of the fuel. Another aspect of this invention is that certain redunancy is built in. That is a back up supply of inerting gas is provided. This feature advantageously enhances the reliability of the system.

Figure 1:
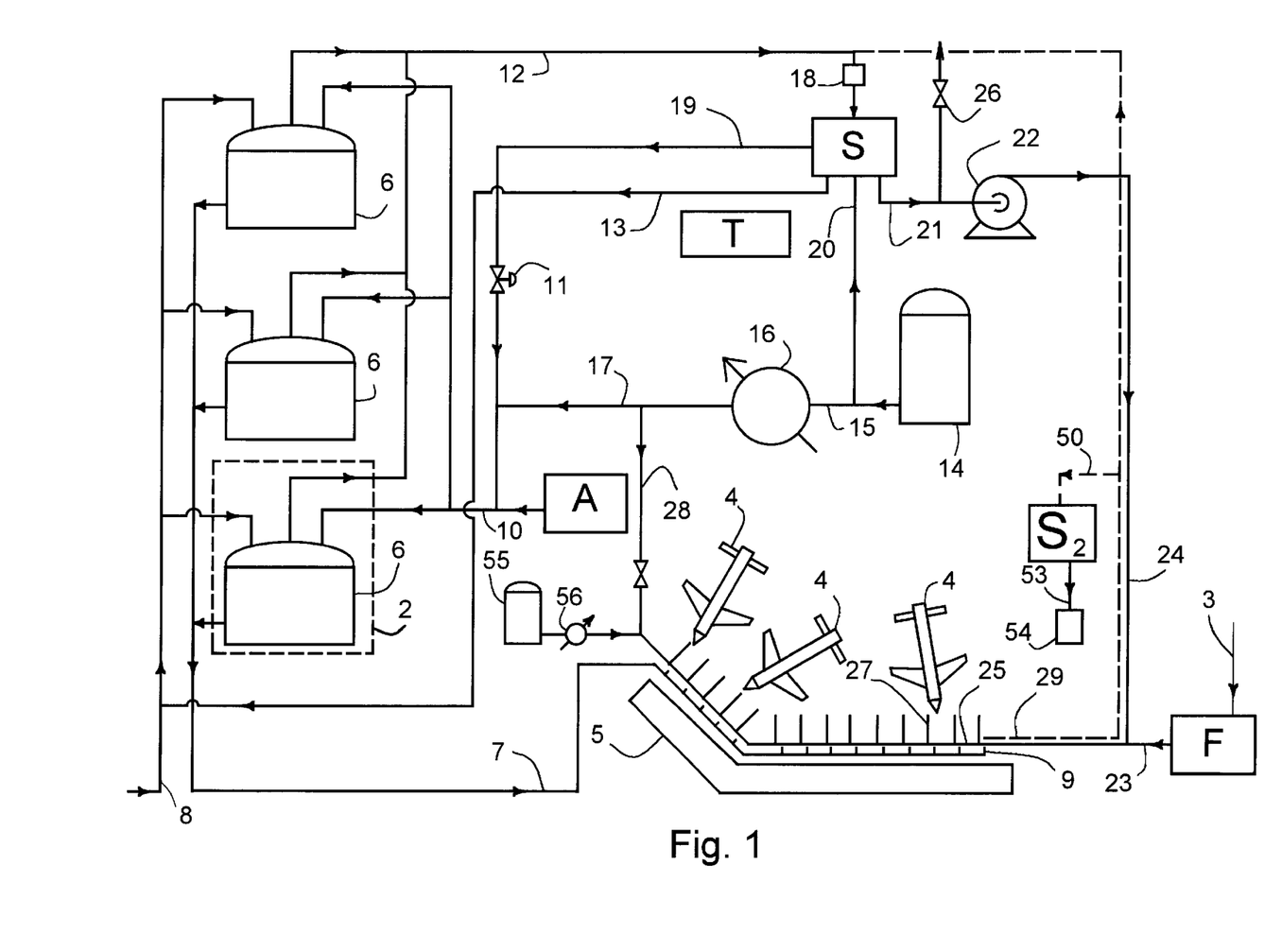
FIG. 1 is a flow diagram of a preferred ground based aircraft fuel inerting system according to this invention.

The present invention can be better understood with reference to FIG. 1. The system is intended to service the fuel tanks of aircraft 4 while on the ground, and preferably while the aircraft are positioned near the passenger boarding or cargo loading terminal buildings which are represented by an elongated concourse 5. Other concourse arrangements may be used at different airports, largely depending upon the size and nature of the airport (e.g., passenger/cargo/combination and public or private air transportation). The arrangement of the concourse shown in FIG. 1 is not limiting to the applicability of this invention.

A tank farm of one or more (three shown) aircraft fuel bulk storage tanks 6 is usually located some distance from the boarding/loading concourse. Appropriate valves (not shown) are provided to permit using any one of the bulk storage tanks 6 alone or in combination with other such tanks. The bulk storage tanks deliver fuel for loading into the aircraft onboard fuel tanks from the tank farm through a supply transfer line 7 which extends along the concourse and has a number of delivery ports 9. The term "transfer line", sometimes abbreviated to "line" means a fluid conduit of appropriate material of construction adapted to move a liquid or a gas between two locations. The ports are located conveniently near the aircraft boarding/loading areas of the concourse. Each port is equipped with conventional block valve and hose and hose connection (not shown) which are used to connect the fuel supply transfer line to the onboard fuel tank of an aircraft to be filled with fuel.

In one embodiment the fuel delivered to the aircraft is deoxygenated to a safe, non-explosive oxygen concentration while in bulk storage tanks 6. Fresh aircraft fuel, typically jet fuel type "A1" is supplied to the bulk storage tanks via inlet transfer line 8. This fuel usually contains dissolved oxygen absorbed from the air during normal course of manufacture and transfer to the tank farm. The dissolved oxygen content of the fresh fuel can be about 50 parts per million by weight ("ppm") or more. If liberated from the liquid fuel during depressurization as an aircraft ascends during flight, this amount of dissolved oxygen could raise the concentration of oxygen in the aircraft fuel tank head space. Thus one aspect of this invention is adapted to remove enough dissolved oxygen from the fuel such that liberation of any remaining dissolved oxygen during flight is unable to elevate the oxygen concentration in the fuel tank head space above an unsafe level. Thus it is desired to provide a dissolved oxygen content of the fuel such that the head space oxygen concentration is below a preselected limit. It is preferred to reduce the dissolved oxygen concentration of the fuel in bulk storage preferably to less than about 5 ppm and more preferably to less than about a 3 ppm prior to loading the fuel on board aircraft.

Figure 2:
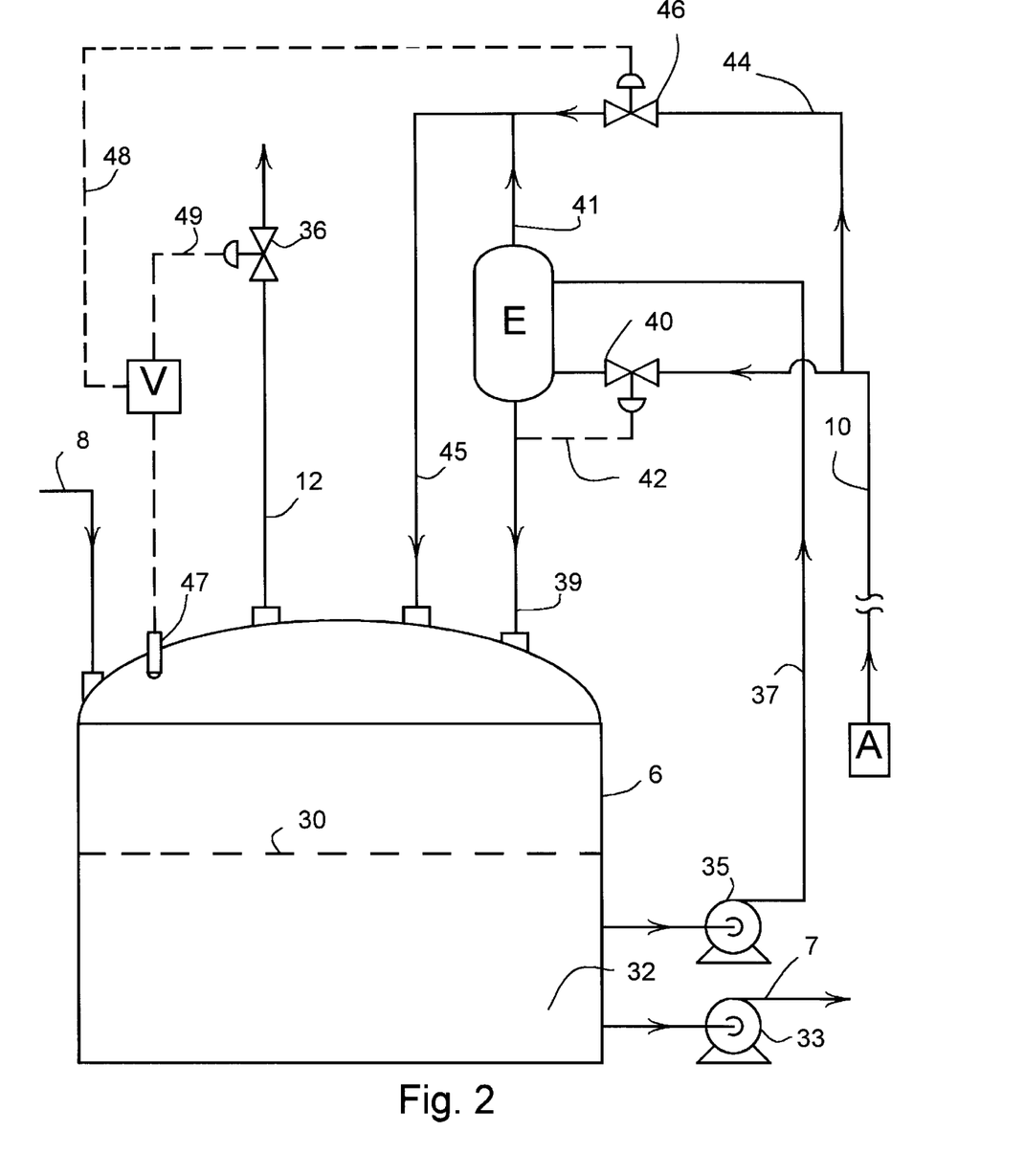
FIG. 2. is a flow diagram of portion of the system of FIG. 1 within border 2.

Fuel deoxygenation is accomplished by a process that takes place utilizing equipment within the border section 2 of FIG. 1 that is shown in FIG. 2 and described in greater detail below. This process consumes a very low oxygen concentration inert gas stream 10, such as nitrogen. Preferably, the gas is high purity nitrogen having oxygen concentration of less than about 0.5 vol. %, and more preferably, at most about 0.1 vol. % oxygen. Such high purity nitrogen can be produced from ambient air utilizing an on-site, high purity nitrogen enriched air generator such as an APSA™ Advanced Product Supply Approach system (A in FIG. 1).

The APSA system produces nitrogen enriched air from ambient air basically as follows. Water, carbon dioxide and other airborne impurities, such as dust, particulate matter and aerosols of water and/or oil, are removed from the compressed air which is then cooled in a heat exchanger and fed into a column. Cryogenic distillation is carried out in the column which contains a column packing to promote separation of nitrogen from the air in accordance with conventional distillation principles. During the cryogenic distillation, nitrogen is separated from the nitrogen/oxygen mixture of the feed air. The column is normally oriented vertically allowing for liquid nitrogen to cascade downward while nitrogen/oxygen gas mixture flows upward. In simple terms, the oxygen condenses in contact with falling liquid nitrogen while nitrogen gas continues to rise through the column. Nitrogen product and waste gases are made to flow through the heat exchanger and cools the incoming fresh air to be separated. The nitrogen product flows through conventional flow control and measurement instruments, including oxygen analysis and leaves as a compressed gas stream. Multiple columns can be deployed within the APSA system to optimize flow and extent of separation (i.e., nitrogen purity). The specific arrangement, size and details of each element in the APSA system are selected to meet the requirements of a particular nitrogen enriched air production operation.

The APSA system is initially charged by a supply of ultra high purity liquid nitrogen, preferably greater than 99.99 vol. % nitrogen obtained from a liquid nitrogen storage vessel 14. This ultra high purity nitrogen can be fed to the APSA system (via line not shown) to start the system from a shut down condition. The storage vessel also supplies liquid nitrogen 15 that is vaporized in heat exchanger 16 to form ultra high purity nitrogen gas 17 that can back up the APSA system when it is out of service, for example, for maintenance. The ultra high purity nitrogen product gas from the APSA serves as a source of deoxygenating nitrogen for the bulk storage tanks 6 by feeding via transfer line 10 from the APSA system or line 10 and 17 from the liquid storage tank.

As a result of deoxygenating the stored fuel, the bulk storage tanks 6 discharge an off gas stream 12 which contains mostly excess inert gas, the oxygen removed from the fuel and some fuel vapor. The off gas 12 is stripped of substantially all fuel vapor to recover the entrained fuel. This not only allows economical use of the fuel vapor but prevents contamination of ambient air by VOC of the fuel when any of the gas from the stripping operation is vented to atmosphere. The off gas stream is stripped in a condensation unit operation S such as a Solval™ VOC Removal and Recovery system. The condensation unit is cooled by liquid nitrogen refrigerant 20 supplied by the liquid nitrogen storage vessel 14.

The Solval system S strips fuel vapor from noncondensible gas as follows. The fuel vapor bearing off gas is blown through the shell side of a shell and tube heat exchanger while liquid nitrogen flows through the high heat transfer efficient finned tubes. The liquid nitrogen is vaporized to cool the off gas to below about −17.8° C. (0° F.), and preferably, below about −45.6° C. (−50° F.), thereby condensing and separating the fuel as liquid from the slightly oxygen contaminated nitrogen off gas. The Solval system internally can include a preliminary stage condenser refrigerated with a pumped loop of a cool heat exchange fluid such as methanol. This preliminary stage condenser prevents higher freezing point compounds from accumulating on the nitrogen refrigerated heat exchangers. Multiple trains of condensers and/or heat exchangers can be deployed to assure that a fully defrosted path through the Solval system is available at all times. Recovered condensed fuel vapor is returned to the fuel storage tanks 6 as a liquid via line 13 by a conventional pump and valving subsystem (not shown). The ultra high purity nitrogen vapor 19 from the liquid nitrogen generated in system S is returned to the fuel storage tanks through control valve 11 via transfer line 10. Thus, the ultra pure nitrogen from system S supplements the high purity nitrogen produced by unit A. Preferably system S is located in close proximity to the tank farm.

The Solval system produces a "clean" nitrogen stream 21 of substantially fuel-free nitrogen containing at most about 0.5 vol. % oxygen. This stream 21 can be vented through valve 26 to the atmosphere. Optionally, the low oxygen content nitrogen stream 21 can be compressed by compressor 22 and then transferred through line 24 to the concourse for use in aircraft fuel tank head space inerting as will be subsequently explained. Factors which might affect the decision whether to salvage rather than vent this stream include the distance between the Solval system and the fuel tank head space inerting system, the availability of an existing spare transfer line 24 or the need to provide a new line, and the size and cost of operating compressor 22. As an additional option, compressed fuel-free, low oxygen content nitrogen from the discharge of compressor 22 can also be fed into line 19 using a transfer line and valve subsystem (not shown) so that the clean nitrogen returns to the storage tank deoxygenation system. As mentioned, the clean nitrogen return contains some oxygen. However, purity of nitrogen for successful operation of the storage tank fuel deoxygenation system can be maintained by controlling the proportion of clean nitrogen to ultra purity nitrogen from unit A. The ratio of cleaned nitrogen to ultra high purity nitrogen as well as all important process variables of the entire aircraft fuel tank inerting system can be controlled with a conventional digital control system T.

The bulk storage fuel deoxygenation system can understood with reference to FIG. 2. Like elements of the figures are referenced with the same numbers. Fresh liquid aircraft fuel enters tank 6 through supply line 8. The liquid fuel settles within the tank to a level defining a liquid-vapor interface shown as dashed line 30. Deoxygenated liquid fuel 32 is pumped by pump 33 through transfer line 7 to the aircraft at the concourse. Deoxygenation is accomplished according to this invention by circulating a flow of liquid fuel 32 through circulation pump 35 via line 37 to eductor E and back to tank 6 via line 39. Lines 8 and 39 can discharge into tank 6 either above or below the liquid surface 30.

Within eductor E the recirculating fuel from line 37 is forced through a venturi nozzle at high flow rate. Ultra high purity nitrogen from unit A is fed into eductor E via line 10 so that this nitrogen intimately mixes with the circulating fuel in turbulent flow conditions. In this way oxygen dissolved in the fuel equilibrates with the nitrogen and thereby largely leaves the liquid fuel and enters a gaseous nitrogen phase. By positioning the eductor above the storage tank, it is possible to have the deoxygenated fuel drain back into tank 6. In an alternate arrangement, the eductor can be positioned alongside tank 6 in which case a pump can be used to return oxygen depleted fuel to the tank.

The rate of ultra high purity nitrogen flowing into eductor E is continuously adjusted by control valve 40. The valve is automatically manipulated by a closed loop control system represented by element 42. The control system includes a dissolved oxygen concentration analyzer with a transducer element positioned to sample the deoxygenated fuel draining from eductor E in line 39. The control system parameters are preferably defined and programmed by the automatic digital control system T. The control system is set to admit an effective flow of ultra high purity nitrogen gas as needed to reduce the dissolved oxygen concentration in the fuel below a predetermined set point. The flow of recirculating fuel through line 37 optionally can also be throttled by a valve and control loop (not show) operated by the digital control system to help produce the desired degree of deoxygenation. In general, the ratio of nitrogen to circulating fuel is increased to decrease the concentration of oxygen in the deoxygenated fuel.

Nitrogen bearing the stripped oxygen from the fuel flows from the top of the eductor via line 41. The dilution effect of the nitrogen from unit A is such that the oxygen concentration in the eductor overhead gas stream is very low, and preferably below about 0.5 vol. %. This low oxygen concentration stream is added to a make up flow 44 of ultra high purity nitrogen. The oxygen is thereby further diluted to still lower concentration before entering the head space of tank 6 via line 45. The purpose of the make up flow is to maintain a slightly positive pressure, low oxygen content, inert gas atmosphere in contact with the liquid fuel in the tank so that oxygen from the ambient atmosphere cannot infiltrate and re-dissolve into the liquid fuel. Excess gas is vented from the tank via line 12 and directed to the system S (FIG. 1.). The pressure in the tank is maintained at a small amount above atmospheric pressure by a back pressure device, e.g., a valve or regulator 36 in line 12 (FIG. 2) and/or an adjustable flow rate controlling fan 18 (FIG. 1).

The amount of make up nitrogen is adjusted by control valve 46 which is throttled under direction of a closed loop automatic vapor control system V. This control loop utilizes a pressure sensor and an oxygen vapor concentration analyzer (collectively shown as element 47). The control system monitors the tank head space pressure which can rise and fall due to rising or lowering liquid fuel inventory as well as changing rate of make up flow. The control system also checks that the oxygen concentration in the head space. The vapor control system using control ling 48 thus causes valve 46 to admit more or less ultra high purity nitrogen as necessary to maintain tank head space pressure above a minimum set point and to keep the oxygen concentration of the vapor below a maximum, preferably at most about 2 vol. %. The vapor control system can optionally supervise the activity of the back pressure device in line 12 via control link 49.

Figure 3:
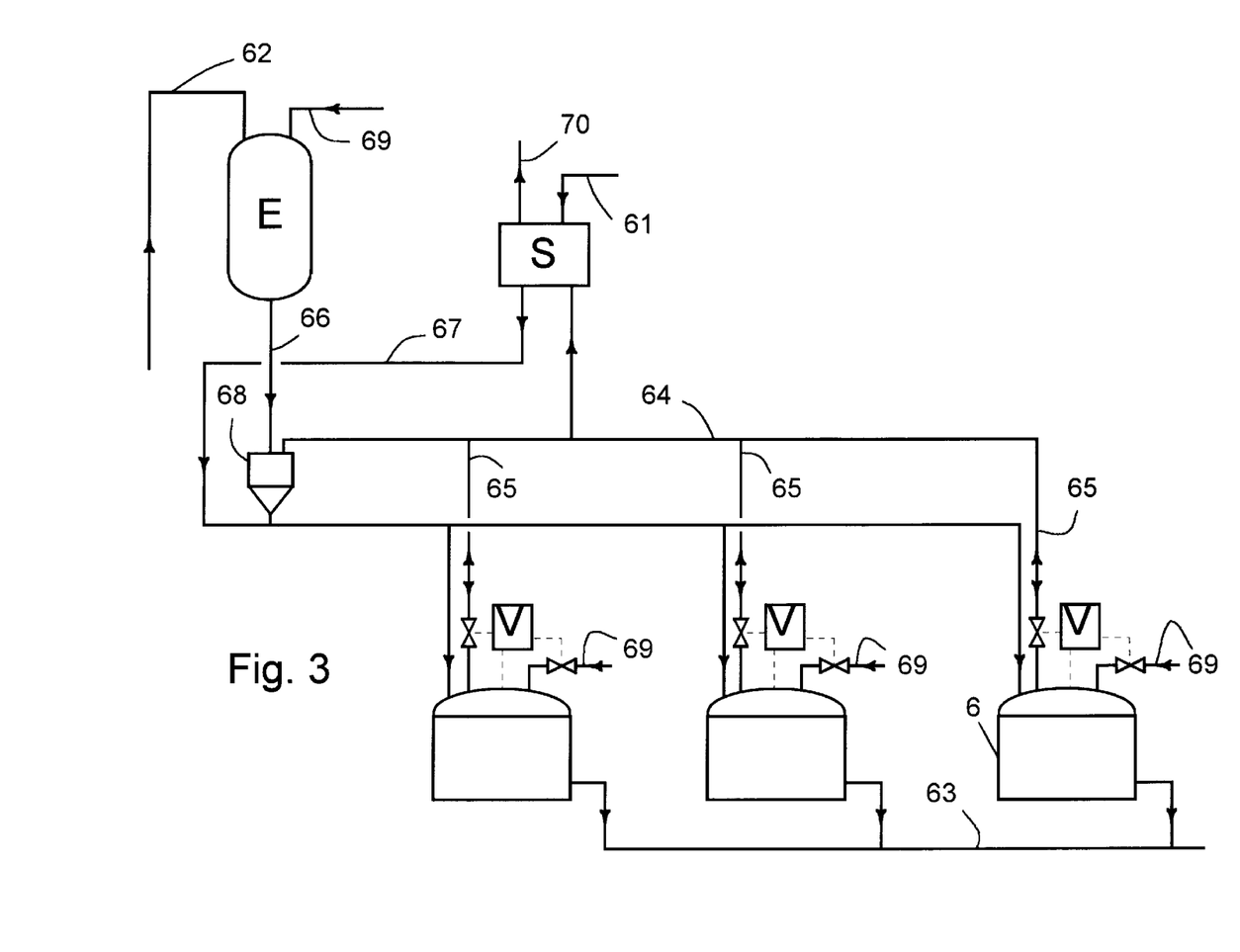
FIG. 3 is a flow diagram of an embodiment of an aircraft fuel scrubbing system according to the present invention.

A preferred embodiment of the fuel scrubbing system is shown in FIG. 3. This diagram shows three bulk fuel storage tanks 6 that commonly feed scrubbed fuel to aircraft fuel tanks (not shown) via a common transfer line 63. Raw fuel 62 potentially having high oxygen content enters the system in eductor E. There it is contacted in turbulent flow with gaseous nitrogen 69 as previously explained to transfer oxygen from the fuel to the nitrogen. The mixture 66 of deoxygenated fuel and oxygen-entrained nitrogen gas drops to a conventional gas/liquid separator 68 where the gaseous components depart usually upward to gas manifold 64 while scrubbed liquid fuel continues downward to feed the bulk storage tanks. The oxygen-containing nitrogen that also entrains fuel vapor can transport to fuel recovery unit S. Also as previously explained, this unit contacts the fuel/nitrogen/oxygen gas stream with cold liquid nitrogen 61. This discharges an oxygenated nitrogen gas stream 70 for disposal and returns a deoxygenated, condensed fuel product 67. The condensed fuel 67 joins the eductor scrubbed fuel and drains into the bulk storage tanks 6. Each tank is kept blanketed with slightly positive pressure nitrogen gas 69 to assure that oxygen in ambient air does not enter the tanks as the tanks feed fuel. The atmosphere in the tanks is controlled by control systems V. As above, these sense pressure and oxygen concentration in the tank and throttle valves in the nitrogen supply lines 69 and vent lines 65 to maintain desired set points. Arrows in vent lines 65 are shown to point in opposite directions. This is meant to convey that gas in these lines can flow in either direction depending on the dynamics obtaining at a given point in time. For example, if a particular tank 6 is feeding scrubbed fuel forward, its liquid level will drop and it can accept some fuel/nitrogen gas from separator 68 to replace the volume of liquid fuel discharged. Of course, the vapor control system V will prevent too much oxygen of the fuel/nitrogen gas stream in header 64 from entering the tank 6. Additional make up nitrogen is provided through the appropriate nitrogen line 69. By way of another example, when fuel fills a particular tank 6, the liquid level will rise and displace gas from the tank head space. This gas containing fuel vapor and nitrogen can flow into the fuel nitrogen gas stream header 64. From there it will be treated in recovery unit S. The fuel vapor will ultimately be returned to tanks 6. This embodiment permits a single eductor to scrub fuel for a farm of tanks. Advantageously, the tanks can be in different states simultaneously, i.e., feeding (liquid level descending), filling (liquid level rising) and storing (liquid level stationary). Therefore, this system provides a constant ready supply of scrubbed fuel.

With further reference to FIG. 1., use of the novel system to render aircraft fuel tanks inert will be explained next. Deoxygenated fuel from bulk storage tanks 6 is delivered to the aircraft boarding/loading concourse 5 via transfer line 7 as mentioned. The deoxygenated fuel is distributed at the concourse to individual aircraft through ports 9 proximate to each gate where aircraft can be boarded and/or loaded. The fuel can be charged into the on-board fuel tanks using conventional valves and flexible hoses in the customary manner.

The head space of the on-board aircraft fuel tanks should be "inerted" preferably prior to and during charging of the deoxygenated fuel. By "inerting" is meant that the gas in the vapor space above the fuel in the tank, which is sometimes referred to as "ullage", should be replaced by low oxygen concentration inert gas. The gas can be argon, carbon dioxide, nitrogen or another such gas. Nitrogen is preferred. The oxygen concentration of the head space should be reduced to less than about 12 vol. %, preferably at most about 10 vol. % and more preferably at most about 8 vol. %. The reduction can be accomplished by purging the head space with the low oxygen-content inert gas. A preferred source of inert gas according to the present invention is highly nitrogen enriched air having a nitrogen concentration of at least about 95 vol. %, more preferably at least about 97 vol. % and most preferably at least about 98 vol.

Highly nitrogen enriched air for head space inerting can be produced from ambient air having about 79 vol. % nitrogen and about 21 vol. % oxygen with a selectively permeable gas separation membrane system. These systems are well known in the art. Initially the ambient air is filtered to remove dust and cleaned of water in aerosol form. Very basically, the nitrogen enriching membrane separation system functions by contacting ambient air with one side of the membrane. Usually, oxygen permeates the membrane at higher rate than nitrogen producing a composition of high oxygen concentration on the opposite, so-called "permeate" side of the membrane. This leaves a nitrogen-rich gas composition on the first, occasionally called "retentate" side of the membrane. A typical selectively gas permeable membrane system for producing highly nitrogen enriched air from ambient air is commercially available under the tradename "Floxal".

As seen in FIG. 1, ambient air 3 is taken in to a highly nitrogen enriched air supply facility F. This supply facility produces an oxygen enriched air stream (not shown) which can be safely vented to the ambient atmosphere. The highly nitrogen enriched air 23 is conveyed by a distribution header line 25 along the aircraft boarding/loading concourse 5 where it can be distributed in proximity to various aircraft through a plurality of nozzles 27. Each distribution nozzle can be connected to the on-board aircraft fuel tanks by valves and flexible hoses (not shown). For example, the highly nitrogen enriched air can be connected to a head space port for this purpose or the fuel filling hose nozzle can be adapted to accommodate a connection to the supply of highly nitrogen enriched air. The highly nitrogen enriched air can be charged into the head space of the tank or injected below the liquid fuel level and thereby made to bubble through the on-board fuel. In either case, a sufficient amount of highly nitrogen enriched air is blown into the on-board fuel tank to displace the existing head space atmosphere with low oxygen content inert gas. Because the highly nitrogen enriched air supply unit F is safe and clean to operate, it can be located in close proximity to the concourse, although location of the unit is not critical to operation of this invention.

Although the present invention has been described largely in terms of an airport having a single concourse having a single nitrogen enriched air source system F, and a single tank farm having a single VOC removal and recovery system S, it is contemplated that multiple concourses, tank farms, and systems S, F, A and T may be present. The number of each system will depend upon the size and type of use of a particular airport. Optionally, the system F at each concourse can be backed up with its own liquid nitrogen storage tank 55 and vaporizer 56 (FIG. 1) to produce nitrogen gas to supply the aircraft fuel tank inerting system through line 25 even when the nitrogen enriched air supply system F is out of service, (e.g., for maintenance). As an additional option, all of the nitrogen enriched air supply systems of each concourse can be manifolded together to form a nitrogen gas supply grid thereby allowing gas to be consumed at any point within the grid system without being dependent on any particular nitrogen enriched air supply system F. This additional option provides greater redundancy and further improved reliability.

It is thus apparent that the gas displaced from the head space of the on-board aircraft fuel tanks will likely entrain fuel vapor. If not otherwise contained, the displaced gas will emit undesirable VOC to the ambient atmosphere. Accordingly, the present invention optionally provides for the collection of VOC containing gas displaced from the on-board fuel tanks during the head space inerting step. To this end each aircraft boarding/loading position along the concourse additionally includes a nozzle adapted to receive the gas displaced from the on-board tank during fuel loading. The nozzle can be connected to the tank at a separate tank vent port, to a dedicated adapter fitted to the inerting gas supply line, or to a fitting on the fuel filling nozzle. The alternative of connecting the VOC collection line to the inert gas supply fitting provides the advantage that only a single new connection needs to be made to the fuel tank to feed the inert gas and to remove the displaced fuel vapors. The last alternative advantageously obviates the need to make any modifications to existing aircraft fuel tanks to accommodate inerting and VOC collection. The choice of method of connecting the inerting supply and the VOC collection lines will largely depend upon the nature of the aircraft and the configuration of its on board fuel tanks.

The various displaced fuel vapor receiving nozzles at each aircraft servicing station on the concourse are joined in fluid communication to a common collection header 29. The collection header containing fuel vapor is run back to the system S in which the fuel component is removed from noncondensible gas for recovery and reuse and the low VOC gas can be safely vented to atmosphere or utilized to deoxygenate or blanket the bulk storage tanks. An optional compressor (not shown) can be provided to blow the collected VOC containing inerting gas back to unit S.

Because the fuel stripping unit can be located at a great distance from the concourse, returning the VOC-bearing spent inerting gas can be impractical. Accordingly, an optional additional fuel stripping system unit S2 can be installed closer by, (but at a safe distance from) the concourse. This additional fuel stripping system unit will operate similarly to the main system S and will have the same internal functional elements, although they normally will be of smaller scale. The VOC-bearing spent inerting gas from collection header can be drawn into unit S2 via line 50. The cleaned nitrogen enriched air can be vented to atmosphere and the condensed liquid solvent can be collected through line 53 to a small tank 54. Accumulations of condensed fuel can be transferred into drums or transported by other conventional methods to the main fuel tanks 6 for reuse. This S2 system unit can be powered by liquid nitrogen stored in the optional liquid nitrogen storage tank 55, described above.

The highly nitrogen enriched air supply system might be shut down temporarily for maintenance or other reason. Usually, sufficient overcapacity or redundancy can be built into the membrane system that there will be an adequate supply of highly nitrogen enriched air at all times necessary for fuel tank inerting. As a contingency, vaporized liquid nitrogen from the discharge of heat exchanger 16 can be supplied to distribution header 25 via transfer line 28.

As mentioned, the process of airliner tank inerting at the airport concourses, fuel deoxygenation at the fuel tank farm and the clean-up of the vent gas at the tank farm by the fuel recovery system S can all be monitored by a computer based control system T such as the proprietary Teleflo™ remote telemonitoring system. Such an industrial based computer system allows users to view real time variables, stored data and alarms, and to receive alarms when a part of the overall process experiences trouble. Communication is achieved over the standard telephone lines or satellite link-up. An "APSA" ultra high purity nitrogen generation system, A, a "Solval" VOC abatement facility, S, a "TeleFLO", supervisory digital control system, T, a Vestal™ vapor concentration management system "V", an eductor fuel scrubbing system E, and a "Floxal" highly enriched nitrogen air supply system, F, are each available from Air Liquide America, Houston, Tex.

What is claimed is:

1. A system for reducing a hazard of accidental explosion of aircraft fuel tanks comprising at least one of
   (A) a first supply of ultra high purity nitrogen gas comprising a means for removing water, carbon dioxide and airborne impurities from air thereby producing filtered air, a heat exchanger adapted to cool the filtered air and cryogenic distillation means for separating oxygen from the filtered air,
   B) a second supply of ultra high purity nitrogen comprising a tank containing pressurized, liquid nitrogen and a vaporizer means for vaporizing a stream of liquid nitrogen,
   (C) an aircraft fuel bulk storage tank fuel scrubbing subsystem comprising, an aircraft fuel bulk storage tank, a gas-liquid mixing means for intimately mixing a liquid aircraft fuel in turbulent flow with nitrogen gas from at least one of the first supply and the second supply of ultra high purity nitrogen, and a fuel circulation pump adapted to circulate the aircraft fuel in a flow loop through the bulk storage tank and the gas-liquid mixing means,
   (D) a gas cleaning means for removing a volatile organic compound from a gas mixture generated by the aircraft fuel bulk storage tank fuel scrubbing subsystem, the gas mixture comprising nitrogen gas and the volatile organic compound,
   (E) an aircraft fuel tank head spacing inerting subsystem comprising a membrane separation unit adapted to produce highly nitrogen enriched air from ambient air and a highly nitrogen enriched air distribution header operative to deliver the highly nitrogen enriched air to aircraft loading/boarding positions of a concourse of an airport, and
   (F) an aircraft fuel tank head space venting system comprising a vapor transfer line from the concourse of the airport to the gas cleaning means, and means for removably connecting the vapor transfer line to the aircraft fuel tank head space of aircraft at the aircraft loading/boarding positions.

2. The system of claim 1 in which the gas cleaning means comprises a condensing heat exchanger which is operative to condense volatile organic compounds from the gas mixture, and a vent adapted to emit to ambient atmosphere nitrogen gas produced by the gas cleaning means which nitrogen gas is substantially free of the volatile organic compound components.

3. The system of claim 1 which comprises more than one element (A)–(F).

4. The system of claim 3 which comprises a plurality of at least one of those of elements (A)–(F) and in which the plural elements are manifolded together to form a nitrogen gas supply grid, thereby allowing nitrogen gas to be consumed anywhere within the grid without depending upon operability of any particular one of the plural elements.

5. The system of claim 3 further comprising
   (A) a plurality of aircraft fuel bulk liquid storage tanks, each tank comprising a headspace vent, a high purity nitrogen supply, and a vapor control system adapted to control feed of the high purity nitrogen gas and a discharge of an exhaust gas through the headspace vent, thereby maintaining the pressure and concentration of gas in the tank at a desired set point, (B) a common discharge transfer line adapted to receive scrubbed aircraft fuel from all of the plurality of bulk liquid storage tanks, (C) an eductor adapted to receive and contact raw aircraft fuel containing dissolved oxygen with nitrogen gas, thereby transferring oxygen from solution in the fuel to the nitrogen gas and producing scrubbed fuel, (D) a separator operative to segregate the scrubbed fuel from the nitrogen gas containing oxygen of (C), (E) a liquid transfer conduit to feed scrubbed fuel from the separator to the bulk liquid storage tanks, (F) a fuel recovery unit adapted to condense aircraft fuel vapor entrained in the nitrogen gas containing oxygen of (C), and (G) a gas stream transfer line in vapor communication with the separator, the fuel recovery unit and the vent of each tank.

6. The system of claim 1 which comprises all of the elements (A)–(F).

7. The system of claim 1 in which the gas cleaning means is positioned proximate to the bulk storage tank and the system further comprises a second such gas cleaning means positioned proximate to the concourse and being adapted to receive nitrogen gas bearing volatile organic compound components discharged from the aircraft fuel tank head space.

8. The system of claim 7 in which the second gas cleaning means comprises a condensing heat exchanger operative to condense volatile organic compounds from a mixture of nitrogen gas and such volatile organic compound, and a vent adapted to emit to ambient atmosphere nitrogen gas substantially free of the volatile organic compound.

9. The system of claim 1 which further comprises a third supply of ultra high purity nitrogen positioned proximate to the concourse and comprising a tank containing liquid nitrogen and a vaporizer means for vaporizing a stream of liquid nitrogen, the third supply of ultra high purity nitrogen thereby providing an installed redundant source of nitrogen gas to the highly nitrogen enriched air distribution header in addition the nitrogen gas provided by the membrane separation unit.

* * * * *